(12) United States Patent
Kadonaga et al.

(10) Patent No.: US 6,323,250 B1
(45) Date of Patent: Nov. 27, 2001

(54) METHOD FOR PRODUCTION OF POROUS MATERIAL

(75) Inventors: Kenji Kadonaga, Takatsuki; Akiko Mitsuhashi, Sanda; Hirotama Fujimaru, Suita; Masazumi Sasabe, Kakogawa; Kazutomo Takahashi, Moriyama; Masuji Izubayashi, Nishinomiya, all of (JP)

(73) Assignee: Nippon Shokubai Co. LTD, Osaka (JP)

( * ) Notice: Subject to any disclaimer, the term of this patent is extended or adjusted under 35 U.S.C. 154(b) by 0 days.

(21) Appl. No.: 09/712,558

(22) Filed: Nov. 14, 2000

(30) Foreign Application Priority Data

Nov. 18, 1999 (JP) .................................................. 11-328683

(51) Int. Cl.$^7$ ....................................................... C08J 9/28
(52) U.S. Cl. ............................................... 521/64; 521/65
(58) Field of Search ......................................... 521/64, 65

(56) References Cited

U.S. PATENT DOCUMENTS

| | | | |
|---|---|---|---|
| 4,522,953 | 6/1985 | Barby et al. | 521/64 |
| 4,788,225 | 11/1988 | Edwards et al. | 521/147 |
| 5,189,070 | 2/1993 | Brownscombe et al. | 521/64 |
| 5,210,104 | 5/1993 | Bass et al. | 521/64 |
| 5,252,619 | 10/1993 | Brownscombe et al. | 521/64 |

FOREIGN PATENT DOCUMENTS 10-36411   2/1998   (JP) .................................. C08F/2/32

*Primary Examiner*—Morton Foelak
(74) *Attorney, Agent, or Firm*—Fish & Richardson P.C.

(57) ABSTRACT

An object of this invention is to provide a method for the production of a porous material by polymerizing a water-in-oil type high internal phase emulsion in a briefer time than a conventional technique without impairing the stability of the emulsion. The object of this invention can be accomplished by a method for the production of a porous material comprising a step of polymerizing a water-in-oil type high internal phase emulsion containing a polymerization initiator, wherein the polymerization initiator is a redox type initiator combining an oil-soluble oxidizing agent and a reducing agent, either of the oil-soluble oxidizing agent or the reducing agent is preparatorily added to form the emulsion, and thereafter the remainder of the reducing agent or the oil-soluble oxidizing agent is added to the emulsion to polymerize the added emulsion.

4 Claims, No Drawings

METHOD FOR PRODUCTION OF POROUS MATERIAL

BACKGROUND OF THE INVENTION

1. Field of the Invention

This invention, in the production of a porous material, preferably a porous material having continuous pores formed in the surface and the interior thereof and consequently containing continued cells (hereinafter occasionally referred to as "open cells") by polymerizing a water in oil type high internal phase emulsion (hereinafter occasionally referred to briefly as "HIPE"), relates to a method for the production of a porous material by the continuous operation from the step of supplying the HIPE through the step of polymerizing it. More particularly, this invention relates to a method for the production of a porous material by the continuous operation from the step of supplying the HIPE through the step of polymerizing it and in which the porous material can be extensively utilized for (1) liquid absorbent materials such as, for example, ① core materials to be used in disposable diapers for absorbing water, urine, and other excretions and ② waste oil treating agents and waste solvent treating agents to be used for absorbing oils and organic solvents; (2) energy absorbent materials such as, for example, sound absorbers and heat absorbers in automobiles and buildings for absorbing sound and heat; and (3) chemical impregnating substrates such as, for example, toiletry products impregnated with a flavoring agent, a detergent, a glossing agent, a surface protecting agent, a flame retardant, and the like.

2. Description of the Related Art

The term "HIPE" refers to an emulsion comprising a water phase, i.e. a dispersing phase (internal phase), and an oil phase, i.e. an external phase, and at a W/O ratio of not less than about 3/1. It has been known to produce a porous material from the HIPE (hereinafter occasionally abbreviated simply as the "HIPE method").

The HIPE method is an excellent process for producing a low-density foam of open cells having minute diameters, as compared with the porous material which is produced by using a foaming agent (hereinafter occasionally abbreviated as the "foam") and which is liable to produce a foam of independent cells having comparatively large diameters.

Methods for producing a foam from the HIPE have been disclosed in U.S. Pat. No. 4,522,953, U.S. Pat. No. 4,788,225, U.S. Pat. No. 5,252,619, and U.S. Pat. No. 5,189,070, for example.

A method which comprises forming an HIPE containing a water-soluble and/or oil-soluble initiator and thermally polymerizing the HIPE at 50° C. or 60° C. for 8 hours to 72 hours has been disclosed in U.S. Pat. No. 4,522,953 and U.S. Pat. No. 4,788,225. Further, a method which comprises forming an HIPE, subsequently adding a polymerization initiator thereto, and polymerizing it for four to eight hours has been disclosed in U.S. Pat. No. 5,210,104. Furthermore, a method which comprises forming an HIPE containing an initiator and then polymerizing the HIPE at 100° C. or at a temperature approximating closely thereto thereby decreasing the polymerization time to a level in the range of 3to 5hours has been disclosed in U.S. Pat. No. 5,252,619 and U.S. Pat. No. 5,189,070.

The methods disclosed in U.S. Pat. No. 4,522,953 and U.S. Pat. No. 4,788,225 require an unduly long polymerization time and suffer from deficiency in efficiency of production. Although the methods disclosed in U.S. Pat. No. 5,252,619 and U.S. Pat. No. 5,189,070 enable the polymerization time to be decreased by using the high polymerization temperature, they entail a possibility of requiring the polymerization to continue for several hours, moreover impairing the stability of the HIPE, inducing the liberation of water, and failing to afford a porous material having an expected pore diameter.

According to the method disclosed in U.S. Pat. No. 5,210,104, although the emulsion stability of the HIPE can be improved because the HIPE is formed in the absence of a polymerization initiator and the addition of the polymerization initiator is effected after the formation of the HIPE, the polymerization time is required to last for several hours.

It is an object of this invention to develop a method for the production of a porous material which can complete the polymerization in a briefer time than conventional techniques without impairing the stability of the HIPE.

For the purpose of decreasing the polymerization time, it suffices to increase the decomposition rate of the initiator and consequently heighten the concentration of radicals in the polymerization system. Since an initiator combining an oxidizing agent and a reducing agent (redox initiator) quickly decomposes at a relatively low temperature, the use of the redox initiator for the polymerization of an HIPE can be expected to complete the polymerization in a brief time even at a low temperature sufficient not to impair the stability of the HIPE. An attempt to form an HIPE containing the redox initiator and polymerize this HIPE in such a briefer time than conventional techniques as, for example, within one hour has been ascertained to encounter several problems.

An HIPE can be obtained by stirring and emulsifying an oil phase with a water phase at a temperature in the approximate range of room temperature to 80° C. for a prescribed time. The difference between the temperature of the HIPE thus produced and the polymerization temperature may be preferably as small as possible. To be more specific, an attempt to heighten a low temperature of an HIPE to a higher polymerization temperature possibly elongates the time required for the temperature elevation to such an extent as of lowering the productivity. An attempt to heat the HIPE suddenly in a brief time possibly results in impairing the stability of the HIPE and degrading the quality of the produced porous material. On the other hand, an attempt to emulsify an HIPE at a temperature approximating closely to a polymerization temperature thereof may entail a clear phenomenon of giving rise to a polymerizing reaction of the HIPE and inducing the HIPE to solidify in an emulsifying device during the course of the emulsification, and thus suffering the HIPE to emulsify insufficiently.

SUMMARY OF THE INVENTION

The present inventors, after pursuing a diligent study in order to form an HIPE stably at a temperature approximating closely to the polymerization temperature and realizing the polymerization in a brief time by using a redox initiator, have found that by essentially using an oil-soluble oxidizing agent in an oxidizing agent, forming an HIPE containing either an oxidizing agent or a reducing agent, and thereafter incorporating the other oxidizing agent or reducing agent in the HIPE, the polymerization of the HIPE can be completed in a brief time without impairing the stability of the HIPE. This invention has been perfected based on this knowledge.

A method for production of porous cross-linked polymer material which comprises separately adding an oxidizing agent and a reducing agent of a redox type initiator has been disclosed in JP-A-10-36,411. This method as disclosed therein comprises, in the polymerization of an HIPE with a redox type initiator, preparing in advance an HIPE with a water-soluble oxidizing agent added thereto, adding an aqueous solution of a reducing agent to the mixture and thereafter polymerizing the resultant HIPE mixture. This method is mainly targeted at obtaining a porous cross-linked polymer material having a decreased volume contraction ratio of the HIPE before and after the polymerization and excelling in physical properties. The present inventors have found that the method can also serve effectively as means for stably forming an HIPE and polymerizing the HIPE in a brief time as aimed at by the present invention. After further continuing the study in detail, they have found that this method has problems yet to be solved. Specifically, it has been ascertained to the inventors that while no serious problems arise when an HIPE having added sodium persulfate (as a water-soluble oxidizing agent) is emulsified at room temperature as disclosed in JP-A-10-36,411 or when the temperature exceeding the normal room temperature remains within the approximate bounds of 40° C., a possibility that the HIPE would partially be polymerized and the state of emulsification would become ununiform during the course of emulsification arises when the emulsification temperature is high. In contrast, the present inventors have further found that an oil-soluble oxidizing agent is more liable to exalt the velocity of polymerization than a water-soluble oxidizing agent. The other means for the solution contemplated by this invention has been perfected based on this knowledge. These pieces of knowledge may be academically and logically explained by a postulate that an oil-soluble initiator would exist in a monomer phase, generate a radical in the monomer, and easily attain uniform distribution in the monomer, while a water-soluble initiator would require the migration of a radical from a water phase to an oil phase.

To be specific, an object of this invention can be accomplished by a method for the production of a porous material comprising a step of polymerizing a water-in-oil type high internal phase emulsion containing a polymerization initiator, wherein the polymerization initiator is a redox type initiator combining an oil-soluble oxidizing agent and a reducing agent, either of the oil-soluble oxidizing agent or the reducing agent is preparatorily added to form the emulsion, and thereafter the remainder of the reducing agent or the oil-soluble oxidizing agent is added to the emulsion to polymerize the added emulsion.

The method of this invention can manifest conspicuous effects of completing the polymerization of an HIPE in such a brief time as with in one hour without sacrificing the emulsion stability during the formation of the HIPE because it uses a redox initiator having an oil-soluble oxidizing agent as an essential component, forms an HIPE containing in advance either of an oxidizing agent or a reducing for the construction of a redox system, and thereafter effects the relevant polymerization by adding the remainder of the reducing agent or the oxidizing agent. The method of this invention may be rated as an unusually effective technique for the production of a porous material particularly by the continuous polymerization.

The above and other objects, features and advantages of the present invention will become clear from the following description of the preferred embodiments.

DETAILED DESCRIPTION OF THE PREFERRED EMBODIMENT(S)

This invention relates to a method for the production of a porous material comprising a step of polymerizing a water-in-oil type high internal phase emulsion containing a polymerization initiator, wherein the polymerization initiator is a redox type initiator combining an oil-soluble oxidizing agent and a reducing agent, either of the oil-soluble oxidizing agent or the reducing agent is preparatorily added to form the emulsion, and thereafter the remainder of the reducing agent or the oil-soluble oxidizing agent is added to the emulsion to polymerize the added emulsion.

The component steps of the method of this invention for the production of a porous material will be described below sequentially in the order of their occurrence.

[I] Raw Material (HIPE)
(1) Composition of HIPE

The components of the HIPE which can be used in the method for the production of a porous material contemplated by this invention does not need to be particularly discriminated. It may be properly selected among compositions heretofore known in the art to suit the purpose for which the product is intended to be used. The composition of the HIPE is only required specifically to contain as essential components (a) a polymerizing monomer component containing at least one polymerizing unsaturated group in the molecular unit thereof, (b) a surfactant, (c) water, and (d) a redox type initiator using an oil-soluble oxidizing agent and a reducing agent in combination. It may optionally contain (e) a salt and (f) another additive as arbitrary components as well.

(a) Polymerizing monomer component

The polymerizing monomer component which constitutes the HIPE mentioned above is a compound having at least one polymerizing unsaturated group in the molecular unit thereof. Though it does not need to be particularly restricted so long as it can form a water-in-oil type high internal phase emulsion and be polymerized in the emulsion, the polymerizing monomer component may preferably contain both (a-1) a polymerizing monomer having one polymerizing unsaturated group in the molecular unit thereof and (a-2) a cross-linking monomer having at least two polymerizing unsaturated groups in the molecular unit thereof.

(a-1) Polymerizing monomer having at last one polymerizing unsaturated group in the molecular unit thereof.

Though this polymerizing monomer does not need to be particularly limited, it may properly contain at least partly a (meth)acrylic ester, preferably not less than 20% by mass of a (meth)acrylic ester, and particularly preferably not less than 35% by mass of a (meth)acrylic ester. As the polymerizing monomer having one polymerizing unsaturated group in the molecular unit thereof, a polymerizing monomer containing a (meth)acrylic ester may desirably be used because the ester permits the production of a porous material excelling in flexibility and toughness.

As typical examples of the polymerizing monomer of (a-1) mentioned above, allylene monomers such as styrene; monoalkylene allylene monomers such as ethyl styrene, alpha-methyl styrene, vinyl toluene, and ethyl vinyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizing monomers may be used either singly or in the form of a mixture of two or more members.

The content of the polymerizing monomer of (a-1) mentioned above is preferably in the range of 10 to 99.9% by mass, based on the total mass of the monomer component of (a) mentioned above, because the content in this range permits the produced porous material to acquire pores of very minute diameter. It is more preferably in the range of 30 to 99% by mass and particularly preferably 30 to 70% by mass. If the content of the polymerizing monomer of (a-1) mentioned above is less than 10% by mass, the shortage would be possibly at a disadvantage in embrittling the produced porous material friable and lowering the water absorption. Conversely, if the content of the polymerizing monomer of (a-1) mentioned above exceeds 99.9% by mass, the excess would be possibly at a disadvantage in preventing the produced porous material from acquiring sufficient strength and elastic recovery and from securing a sufficiently large water absorption capacity and a sufficient water-absorbing speed.

(a-2) Cross-linking monomer having at least two polymerizing unsaturated groups in the molecular unit thereof.

Another member of the polymerizing monomer component of (a) above is a cross-linking monomer having at least two polymerizing unsaturated groups in the molecular unit thereof This cross-linking monomer does not need to be particularly restricted but is only required to be capable of being polymerized in the water-in-oil type high internal phase emulsion and forming the emulsion similarly to the polymerization monomer of (a-1) mentioned above.

As typical examples of the cross-linking monomer of (a-2) mentioned above, aromatic monomers such as divinyl benzene, trivinyl benzene, divinyl toluene, divinyl xylene, p-ethyl-vinylbenzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as vinyl furan; sulfur-containing monomers such as divinyl sulfide and divinyl sulfone; aliphatic monomers such as butadiene, isoprene, and pentadiene; ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol (meth)acrylate, octane diol di(meth)acrylate, decane diol di(meth)acrylate, trimethylol propane di(meth)acrylate, trimethylol propane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, N,N'-methylene bis(meth)acrylamide, triallyl isocyanurate, triallyl amine, and tetraallyloxy ethane, and ester compounds of such a polyhydric alcohol as hydroquinone, catechol, resorcinol, and sorbitol with acrylic acid or methacrylic acid may be cited. These cross-linking monomers may be used either singly or in the form of a mixture of two or more members.

The content of the cross-linking monomer of (a-2) mentioned above is properly in the range of 0.1 to 90% by mass,preferably 1 to 70% by mass, and particularly preferably 30 to 70% by mass, based on the total mass of the monomer component of (a) mentioned above. If the content of the cross-linking monomer mentioned above is less than 0.1% by mass, the shortage would be possibly at a disadvantage in preventing the produced porous material from acquiring sufficient strength and sufficient power of elastic recovery, manifesting a sufficient absorption capacity per unit volume or per unit mass, and securing a sufficient water absorption capacity and water-absorbing speed. Conversely, if the content of the cross-linking monomer mentioned above exceeds 90% by mass, the excess would be possibly at a disadvantage in embrittling the porous material and lowering the water absorption.

(b) Surfactant

The surfactant which is essential for the construction of the HIPE mentioned above does not need to be particularly restricted but is only required to be capable of emulsifying a water phase in an oil phase forming the HIPE. The nonionic surfactants, cationic surfactants, anionic surfactants, and amphoteric surfactants which have been heretofore known to the art may be used.

Among these surfactants, the nonionic surfactants include nonyl phenol polyethylene oxide adducts; block polymers of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monomyristylate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides, for example. They may preferably have HLB not exceeding 10, more preferably in the range of 2 to 6. These nonionic surfactants may be used in the form of a combination of two or more members. This combined use may possibly result in improving the stability of the HIPE.

The cationic surfactants include quaternary ammonium salts such as stearyl trimethyl ammonium chloride, ditallow dimethyl ammonium methyl sulfate, cetyl trimethyl ammonium chloride, distearyl dimethyl ammonium chloride, alkylbenzyl dimethyl ammonium chloride, and lauryl trimethyl ammonium chloride; alkyl amine salts such as coconut amine acetate, and stearyl amine acetate; alkyl betaines such as lauryl betaine, stearyl betaine, and lauryl carboxymethyl hydroxyethyl imidazolium betain; and amine oxides such as lauryl dimethyl amine oxide, for example. The use of such a cationic surfactant may possibly enable the produced porous material to manifest excellent antibacterial properties when the material is used for an absorbent material, for example.

The anionic surfactant of a kind having an anionic moiety and an oil-soluble moiety can be advantageously used. As typical examples of the anionic surfactant, such reactive anion emulsifiers having a double bond as, for example, alkyl sulfates such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salts; sodium dodecyl benzene sulfonate, alkyl sulfonates such as alkali metal sulfates of alkali phenol hydroxyethylene; higher alkyl naphthalene sulfonates; fatty acid salts such as naphthalene sulfonic acid formalin condensate, sodium laureate, triethanol amine oleate, and triethanol amine apiate; polyoxyalkyl ether sulfuric esters; sulfuric esters of polyoxyethylene carboxylic ester and polyoxyethylene phenyl ether sulfuric esters; succinic acid dialkyl ester sulfonates; and polyoxy ethylene alkyl aryl sulfates may be cited. An HIPE may be prepared by using an anionic surfactant in combination with a cationic surfactant.

Incidentally, the combined use of a nonionic surfactant and a cationic surfactant may possibly result in improving the stability of the HIPE.

The content of the surfactant mentioned above may be preferably in the range of 1 to 30 parts by mass, more preferably 3 to 15 parts by mass, based on 100 parts by mass of the total mass of the monomer component of (a) mentioned above. If the content of the surfactant is less than 1 part by mass, the shortage would be at a disadvantage in possibly impairing the stability of the high dispersibility of the HIPE and preventing the surfactant from sufficiently manifesting the operation and function inherent therein. Conversely, if the content of the surfactant exceeds 30 parts by mass, the excess would be at a disadvantage in possibly rendering the produced porous material excessively brittle and disrupting the expected proportionate addition to the effects of the surfactant.

(c) Water

As the water which is an essential component for the construction of the HIPE mentioned above, in addition to purified water and deionized water, waste water to be obtained in the production of the porous material may be used either in its unmodified form or after it has been given a prescribed treatment with a view to promoting the reuse of the waste water.

The content of the water mentioned above may be properly selected to suit the purpose for which the porous material containing open cells aimed at is used (for example, a water absorbent material, an oil absorbent material, a soundproof material, and a filter). It may be decided, for example, so that the HIPE eventually produced will assume an expected water phase/oil phase (W/O) ratio which will be specifically described herein below.

(d) Polymerization initiator

The polymerization initiator which is an essential component for the construction of the HIPE mentioned above is a redox initiator which combines an oxidizing agent and a reducing agent. The oxidizing agent uses an oil-soluble oxidizing agent as an essential component. Optionally, it may use an oil-soluble oxidizing agent in combination with a water-soluble oxidizing agent. As the oil-soluble oxidizing agent, an organic peroxide having satisfactory compatibility with the monomer component mentioned above may be used. The oxidizing agent can be uniformly dissolved in the monomer component, effectively function as a polymerization initiator, and cause the polymerization to be completed in a brief time. When the oil-soluble oxidizing agent is used in combination with a water-soluble oxidizing agent, the velocity of polymerization can be further increased and the produced porous material may be possibly improved in quality.

The oil-soluble oxidizing agent which is an essential component of the redox initiator does not need to be particularly limited but oil-soluble oxidizing agents which have been heretofore used for the polymerization of HIPE may be used. As typical examples of the oil-soluble oxidizing agent, such peroxides as cumene hydroperoxide, t-butylhydroperoxide, di-t-butyl peroxide, diisopropyl benzene hydroperoxide, p-menthane hydroperoxide, 1,1,3,3-tetramethylbutyl hydroperoxide, 2,5-dimethylhexane-2,5-dihydroperoxide, benzoyl peroxide, and methylethyl ketone peroxide may be cited. Further, the water-soluble oxidizing agent which can be used in combination with the oil-soluble oxidizing agent also does not need to be particularly limited but water-soluble oxidizing agents which have been heretofore used for the polymerization of HIPE may be used. As typical examples of the water-soluble oxidizing agent, persulfates such as potassium persulfate, sodium persulfate, and ammonium persulfate; and peroxides such as hydrogen peroxide, potassium peracetate, sodium peracetate, potassium percarbonate, sodium percarbonate, and t-butyl hydroxyperoxide may be cited.

The amount of the oxidizing agent mentioned above to be used may be preferably in the range of 0.05 to 15% by mass, more preferably 1.0 to 10% by mass, based on the total amount of the monomer component of (a) mentioned above. If the amount of the oxidizing agent to be used is less than 0.05% by mass, the shortage would be at a disadvantage in suffering unaltered monomer components to increase unduly and consequently suffering the produced porous material to have an unduly large residual monomer content. Conversely, if the amount of the oxidizing agent to be used exceeds 15% by mass, the excess would be at a disadvantage in rendering the polymerization difficult to control and degrading the mechanical properties of the produced porous material.

Further, the reducing agent does not need to be particularly limited and may be either an oil-soluble or water-soluble reducing agent. As typical examples of the reducing agent mentioned above, water-soluble reducing agents such as sodium hydrogen sulfite, potassium hydrogen sulfite, sodium thiosulfate, potassium thiosulfate, L-ascorbic acid, erythorbic acid, ferrous salts, formaldehyde sodium sulfoxylate, glucose, dextrose, triethanol amine, and diethanol amine; and oil-soluble reducing agents such as dimethyl aniline, diethyl aniline, dimethyl orthotoluidine, cobalt naphthenate, cobalt octanate, zirconium naphthenate, lead naphthenate, and zinc naphthenate may be cited.

The amount of the reducing agent mentioned above to be used may be preferably in the range of 0.05 to 15% by mass, more preferably 1.0 to 10% by mass, based on the total amount of the monomer component of (a) mentioned above. If the amount of the reducing agent to be used is less than 0.05% by mass, the shortage would be at a disadvantage in suffering unaltered. monomer components to increase unduly and consequently suffering the produced porous material to have an unduly large residual monomer content. Conversely, if the amount of the reducing agent to be used exceeds 15% by mass, the excess would be at a disadvantage in rendering the polymerization difficult to control and degrading the mechanical properties of the produced porous material.

The ratio (mass ratio) of the amounts of the oxidizing agent and the reducing agent to be used, i.e., the ratio of the oxidizing agent to the reducing agent, may be in the range of 1/0.01 to 1/10, preferably 1/0.05 to 1/2. If the ratio (mass ratio) of the amounts of the oxidizing agent and the reducing agent to be used, i.e., the ratio of the oxidizing agent to the reducing agent, falls outside the range of 1/0.01 to 1/10, the deviation would be at a disadvantage in degrading the efficiency of initiating the polymerization.

The redox initiator to be used may be a combination of one kind each of the above-mentioned oxidizing agent and reducing agent or a combination of two or more kinds of either the oxidizing agent or the reducing agent.

The redox initiator which combines the oxidizing agent and the reducing agent as mentioned above, when necessary, may be used in combination with another polymerization initiator.

(e) Salts

The salt which is one of the arbitrary components for the construction of the HIPE mentioned above may be optionally used for the purpose of improving the stability of the HIPE.

As typical examples of the salt, water-soluble salts including halogenides, sulfates, and nitrates of alkali metals and alkaline earth metals such as calcium chloride, sodium sulfate, sodium chloride, and magnesium sulfate may be cited. These salts may be used either singly or in the form of a mixture of two or more members. The salt may be preferably added to the water phase. Among other salts cited above, a polyvalent metal salt may be used advantageously from the viewpoint of the stability of the HIPE during the polymerization.

The amount of the salt to be used may be such that the concentration of the salt dissolved in water would fall in the range of 0.1 to 20% by mass, preferably 0.5 to 10% by mass. If the amount of the salt to be used exceeds 20% by mass, the excess would be at a disadvantage economically in causing the waste water squeezed out of the HIPE to contain a salt copiously and adding to the cost of disposal of this waste water without bringing a proportionate addition to the expected effects. If the amount of the salt is less than 0.1% by mass, the shortage would possibly prevent the added salt to manifest the operation and the effect satisfactorily.

(f) Other additive

Other various kinds of additives may be properly used provided that they be capable of imparting qualities and functions of their own and consequently resulting in improving the production conditions, the properties of the HIPE, and the performance of the porous material. For example, a base and/or a buffer may be added for the purpose of pH adjustment. The contents of these other additives may be properly decided so as to ensure thorough manifestation of qualities, functions, and economy commensurate to the respective purposes of addition. The timing for the addition is only required to be such that a relevant additive would effectively manifest the performance and function thereof without imparting any adverse effect to the properties of the HIPE. The addition may be made in advance to the water phase and/or the oil phase. Alternatively, the addition may be made during the preparation of the HIPE by mixing the water phase with the oil phase. Otherwise, the addition may be separately made to the HIPE which has been prepared.

(2) Production of HIPE (a) Step for formation (step for emulsification) of HIPE

For a start, the composition of the HIPE of this invention must contain a redox initiator which combines an oil-soluble oxidizing agent (and optionally a water-soluble oxidizing agent) and a reducing agent as described above. Hereinafter unless otherwise specified, the HIPE may be construed to include both kinds, i.e. ① an HIPE which contains both the oil-soluble oxidizing agent (and optionally a water-soluble oxidizing agent) and the reducing agent as combined in the form of a redox initiator, and ② an HIPE which is prepared by adding either of the oil-soluble oxidizing agent (and optionally a water-soluble oxidizing agent) or the reducing agent of the redox initiator in advance. Exclusively when these two kinds must be particularly discriminated as when the subject matter such as "W/O" which will be specifically described herein below must be clarified, for example, the HIPE of the kind of ① above will be referred to as "HIPE (completed product)" and the HIPE of the kind of ② above as "HIPE (intermediate product)".

This invention effects the preparation of the HIPE by a method which comprises combining the oil phase which is a mixture of a monomer component, a surfactant, etc. and the water phase which is a mixture of water, a water-soluble salt, etc. and stirring them till the emulsification has been attained to form an HIPE.

According to this invention, a redox initiator which combines a oil-soluble oxidizing agent (and optionally a water-soluble oxidizing agent) and a reducing agent as described above is used, in which either of the oil-soluble oxidizing agent (and optionally a water-soluble oxidizing agent) or the reducing agent is added to and mixed with an oil phase and/or a water phase in advance to prepare the oil phase and the water phase, and then they are combined, stirred and emulsified to obtain an HIPE (intermediate product). It is convenient for the oil-soluble oxidizing agent (and optionally a water-soluble oxidizing agent) or the reducing agent to be added in advance to the oil phase when it is soluble in oil or to the water phase when it is soluble in water. It is also conceivable to add to the water phase an emulsion of an oil-soluble oxidizing agent or an emulsion of an oil-soluble reducing agent. More specifically, an uniform oil phase may be prepared by stirring components for forming the oil phase, i.e. the monomer component mentioned above and the oil-soluble oxidizing agent or the oil-soluble reducing agent intended to be added in advance (which may be or may not be additionally used when a water-soluble oxidizing agent or a water-soluble reducing agent, or an emulsion of an oil-soluble oxidizing agent or an emulsion of an oil-soluble reducing agent is used in a water phase side), in the respective amounts specified above at a prescribed temperature. Separately, an uniform water phase may be prepared by adding with stirred the components for forming the water phase, i.e. a water-soluble oxidizing agent or a water-soluble reducing agent, or an emulsion of an oil-soluble oxidizing agent or an emulsion of an oil-soluble reducing agent intended to be added in advance (which may be or may not be additionally used when an oil-soluble oxidizing agent or an oil-soluble reducing agent is used in the oil-phase side), and optionally a salt, in water and heating the resultant mixture to a prescribed temperature in the range of 30 to 95° C. The optimum temperature of the water phase and the oil phase is in the range of 20 to 100° C. From the viewpoint of the stability of the HIPE, it is preferably in the range of 40 to 95° C. Incidentally, it is commendable to mix the oil phase and the water phase after both or either of these phases has the temperature thereof adjusted preparatorily to a prescribed level. At the step of forming the HIPE, this preparatory adjustment of the temperature to the prescribed level may be preferably effected on the water phase because of the larger amount thereof. Then, the HIPE can be stably prepared by mixing the water phase with the oil phase efficiently and exerting a proper shear force to bear on the mixture being formed.

In the case of the combined use of an oil-soluble oxidizing agent and a water-soluble oxidizing agent, since the speed of generating radical is high, HIPE can be cured (polymerized) in a brief time. By adding an oil-soluble oxidizing agent and a water-soluble oxidizing agent separately before and after the emulsification process according to this invention, both the oil-soluble oxidizing agent and the water-soluble oxidizing agent should not be simultaneously present in the emulsification process. By this addition, such a trouble can be avoided as that the polymerization of the HIPE is started during the emulsification process to destroy the emulsified state. Incidentally, an oxidizing agent may be thermally decomposed to generate a radical some extent even in the absence of a reducing agent. When an HIPE is to be formed at a high temperature, therefore, a reducing agent may be preferably preparatorily added to form the HIPE in order to ensure the stability thereof, which is a more preferable embodiment.

(b) Temperature for forming (temperature for emulsification)

The temperature for forming (emulsifying) the HIPE may be properly in the range of normal temperature to 100° C. From the viewpoint of the stability of the HIPE, it is preferably in the range of 40 to 90° C., more preferably 50 to 90° C., and particularly 55 to 85° C.

The HIPE may sometimes become unstable when the monomer component starts to be polymerized during the course of the emulsification (formation of the HIPE) to form a porous material as the polymer. In the case of forming the HIPE (intermediate product) which contains preparatorily an oil-soluble oxidizing agent (and optionally a water-soluble oxidizing agent), therefore, the temperature for formation (temperature for emulsification) of the HIPE may be properly such that the oil-soluble oxidizing agent (and optionally a water-soluble oxidizing agent) may induce substantially no thermal decomposition and the emulsification may be carried out at a temperature lower than the temperature at which the half-life of the oil-soluble oxidizing agent (and optionally a water-soluble oxidizing agent) is 10 hours (10 hour half-life temperature).

In the case of forming the HIPE (intermediate product) which contains preparatorily a reducing agent, since the possibility as mentioned above is absent, the emulsification (formation of HIPE) can be carried out quickly and stably and the conditions for reducing the time for temperature elevation and the energy therefor during the shift of the operation to the polymerization step can be freely selected.

In order to the productivity of the porous material, it is preferred to decrease the time for the polymerization and to shorten the time for temperature elevation from the temperature for the formation of the HIPE (temperature of emulsification) to the prescribed polymerization temperature to the fullest possible extent. For the purpose of attaining the temperature elevation in a brief time, for example, by simply heating an HIPE in a constant temperature bath using hot air or hot water without requiring the use of a special heating device, the difference between the temperature for the formation of the HIPE (temperature for emulsification) and the temperature for the polymerization may be preferably small. The difference between the temperature for the formation of the HIPE (temperature for emulsification) and the temperature for the polymerization, therefore, may be preferably not more than 20° C., more preferably not more than 10° C., and particularly preferably not more than 5° C.

(c) Step for adding reducing agent or water-soluble oxidizing agent.

At the step of adding a reducing agent or an oxidizing agent to an HIPE, the reducing agent or the oil-soluble oxidizing agent whichever is left unused at the step for the formation of (a) mentioned above is added to and mixed with the HIPE (intermediate product) to be obtained at the step for the formation (step for the emulsification) of (a) as mentioned above. The reducing agent or the oil-soluble oxidizing agent (and optionally a water-soluble oxidizing agent) to be used herein can be added in an undiluted state or in the form of a solution or a dispersion diluted or dispersed with a diluting medium such as water or an organic solvent. It is important that the reducing agent or the oil-soluble oxidizing agent (and optionally a water-soluble oxidizing agent) so added should be quickly and uniformly mixed with the HIPE. It is desirable that the HIPE so mixed with the reducing agent or the oil-soluble oxidizing agent (and optionally a water-soluble oxidizing agent) should be introduced into a polymerization vessel or a continuous polymerizing device as quickly as possible.

As a means to effect the admixture of the reducing agent or the oil-soluble oxidizing agent (and optionally a water-soluble oxidizing agent) with the HIPE (intermediate product), it is commended to adopt a method which comprises providing an inlet for a reducing agent or an oil-soluble oxidizing agent (and optionally a water-soluble oxidizing agent) in a path from a stirrer (an emulsifier) for producing the HIPE to a polymerization vessel or a continuous polymerization device, adding the relevant agent whenever necessary (continuously, intermittently, or wholly at once) to the HIPE flowing through the path via the inlet, and mixing them by the use of a line mixer.

The temperature of the reducing agent or the oxidizing agent inside the system during the step of the addition may be preferably such that the system may be retained at the emulsification temperature of (b) as mentioned above.

The HIPE (completed product) consequently obtained may be generally a white highly viscous emulsion.

(d) Apparatus for production of HIPE

The apparatus for the production of the HIPE does not need to be particularly discriminated but may be selected among apparatuses for production of HIPE heretofore known to the art. As the stirrer (emulsifying device) to be used for mixing the water phase with the oil phase, conventional stirring devices and mixing devices may be used. As typical examples thereof, stirring devices provided with propeller type, paddle type, and turbine type vanes, homomixers, line mixers, and pin mills may be cited. Any of these devices may be used. Further, as the stirrer for mixing the remainder of the reducing agent and the oxidizing agent which has not been used during the step for the formation of (a) mentioned above, i.e. the step for the addition of the reducing agent or the oxidizing agent, with the HIPE, conventional stirring devices may be used. As typical examples thereof, line mixers, static mixers, and stirring devices provided with propeller type, paddle type, and turbine type vanes may be cited. Any of these devices may be used.

(e) Water phase/oil phase ratio (mass ratio)

The water phase/oil phase ratio (mass ratio) of the HIPE (completed product) (hereinafter occasionally abbreviated simply as "W/O ratio") is not less than 3/1. The void ratio of the porous material may be decided by varying the W/O ratio. It is, therefore, commendable to select the W/O ratio so as to obtain a void ratio conforming to the use and the object. When the produced porous material is used in a disposable diaper or a sanitary material, the W/O ratio may be preferably set within the approximate range of 10/1 to 100/1.

[II] Polymerization of HIPE (1) Method for polymerization of HIPE

Then, the method for polymerizing the HIPE mentioned above does not need to be particularly limited but may be properly selected among methods for the HIPE polymerization heretofore known to the art. For example, the polymerization may be preferably carried out by the method of standing polymerization under the conditions incapable of disrupting the configuration of water drops highly dispersed in the oil phase of the HIPE. This method of static polymerization has been known in various types such as a batch polymerization method which polymerizes the HIPE batchwisely, a continuous polymerization method which cast polymerizes the HIPE, and a method which effects the polymerization of the HIPE by suitably combining these methods (for example, a combined continuous and batch polymerization method which comprises continuously feeding the HIPE, reeling it, and batch polymerizing the reeled HIPE). These types of methods can be properly used to suit the occasion. For the purpose of harnessing to advantage the effect of quick polymerization which features the method for the production contemplated by this invention, the polymerization may prefer the continuous polymerization method to the batch polymerization method. For example, the continuous polymerization method which comprises continuously casting the HIPE on a belt (a conveying support) in motion and polymerizing the cast HIPE may be properly adopted. Now, the typical polymerization method will be described below. Naturally, this invention is not limited to this method.

(2) Polymerization temperature

The temperature for the polymerization of the HIPE may be in the range of normal temperature to 100° C. From the viewpoint of the stability of the HIPE and the velocity of polymerization, this temperature may be preferably in the range of 40 to 100° C., more preferably 55 to 95° C., particularly preferably 60 to 85° C., and most preferably 65 to 85° C. If the polymerization temperature is less than normal temperature, the shortage would be economically at a disadvantage in unduly elongating the time required for the polymerization and necessitating provision of a new cooling means. Conversely, if the polymerization temperature exceeds 100° C., the excess would be at a disadvantage in possibly imparting pores not uniform in diameter to the produced porous cross-linked polymer and degrading the absorption capacity of the porous cross-linked polymer.

(3) Polymerization time

The method of this invention is effective as a means for stably implementing the polymerization in such a brief time as within one hour. It may be particularly effective in completing the polymerization in a period of not more than 30 minutes. Of course, this invention does not exclude the adoption of a long polymerization time exceeding the upper limit of the range mentioned above.

(4) Polymerization device

The polymerization device which can be used in this invention does not need to be particularly discriminated. Among chemical devices known to the art, that which fits for the relevant polymerization process may be utilized or used as duly modified. In the batch polymerization, for example, a polymerization vessel in a shape fit for the purpose for which the product is used can be used. Then, in the continuous polymerization method, a continuous polymerization device such as a belt conveyor can be used. These devices may be additionally provided with a temperature elevating means and a control means which fit such methods of polymerization as, for example, active thermal energy rays such as microwaves and infrared rays capable of utilizing radiation energy or hot water and hot air.

(5) Properties of porous material after polymerization

The porous material after the polymerization can be designed in an arbitrary shape during the step of production mentioned above. This invention does not discriminate the porous material on account of the shape. In the case of the batch polymerization, for example, the porous material may be obtained in a shape identical with the inner shape of the polymerization vessel. Thus, the porous material may permit the manufacture of products of arbitrary shapes including a complicated three-dimensional shape, a simple cylindrical shape (having a circular cross section), an angular columnar shape (having an angular cross section), and even a sheet-like shape. For the purpose of imparting such an arbitrary shape to the product of the porous material, it suffices to select a polymerization vessel conforming to the shape aimed at such as, for example, a pair of dies or a casting metal vessel. It is further permissible to polymerize the HIPE in the shape of a proper block and cut or slide the polymerized block into sheets of a required profile. In the case of the continuous polymerization, the HIPE may be cast onto a belt conveyor in the shape of a sheet of a fixed thickness. Optionally, this sheet may be given a trapezoidal or semicircular cross section.

(6) Step of after-treatment (reduction to finished product) after formation of porous material.

The porous material according to this invention which can be obtained by the polymerization described above may be utilized as a water absorbing material, an oil absorbing material, a sound absorbing material, a filter, and the like. After the completion of the polymerization, the porous material may be optionally subjected to various treatments such as dehydration, washing, drying, cutting, and impregnation with various chemical agents to give a finished product. Now, these treatments will be described briefly below.

(a) Dehydration

The porous material produced in consequence of the completion of the polymerization may be generally dehydrated by compression, aspiration under a reduced pressure, or the combination thereof. Generally, the dehydration thus implemented may expel a portion in the range of 50 to 98% of the water used, while the remainder of the water would adhere to and remain on the porous material.

The ratio of dehydration may be properly set so as to suit for the purpose for which the porous material is intended, for example.

(b) Compression

The porous material according to this invention can be compressed to one of several parts of the original thickness by the method of pressing the porous material at a temperature and under a pressure which are incapable of breaking the porous texture thereof. The compressed sheet can have a small volume as compared with the original porous material and, therefore, permits a saving in the cost for transportation and storage. From the viewpoint of saving the space for transportation and storage as well as facilitating the handling, the compression to not more than ½ of the original thickness may prove to be effective. More preferably, this compression may be made to not more than ¼ of the original thickness.

(c) Washing

The porous material, for the purpose of imparting an improving surface condition thereto, may be washed with purified water or an aqueous solution or a solvent containing an arbitrarily selected additive.

(d) Drying

The porous material obtained by the steps mentioned above, when necessary, may be heated and dried with hot air or microwaves, or alternatively may be moistened for the adjustment of the water content thereof.

(e) Cutting

The porous material obtained by the steps mentioned above, when necessary, may be cut into proper sizes and worked to obtain a finished product fitting for the varying uses.

(f) Impregnation

The porous material obtained by the steps mentioned above, when necessary, may be impregnated with such an additive as a detergent, an aromatizer, a deodorant, a coloring agent, a wetting agent, and an antibacterial agent so as to be endowed with pertinent forms of functionality.

Now, this invention will be described more specifically below with reference to working examples. It should be noted that this invention should not be limited to these examples. The properties of the porous materials reported in these working examples were determined as shown below. Wherever "parts" is mentioned therein, they are meant as "parts by mass" unless otherwise specified. <Methods for determination of ratio of gel portion and residual monomer content>

(1) Ratio of gel portion

A porous material obtained by polymerizing an HIPE is dehydrated and cut to obtain two samples each measuring several cubic centimeters ($cm^3$). The porous material with water adhered is weighed to find the mass thereof.

Subsequently, one of the samples is dried with a drying device and the dry polymer consequently obtained is weighed to find the mass thereof.

The other sample is placed in a Soxhlet extractor and extracted from acetone as a solvent therein for 24 hours. The porous material which remains after the extraction (gel component) is dried and weighed to find the dry gel mass.

Ratio of gel portion (%)=[(Dry gel mass)/(dry polymer mass)]× 100

(2) Residual monomer content

The component monomers in the Soxlet extractor are determined by gas chromatography to find the total amount of the monomer components.

Residual monomer content (%)={(Total amount of monomers extracted)/[(dry polymer mass)+(total amount of monomers extracted)]}×100

EXAMPLE 1

In a cylindrical vessel provided with a stirrer, an oil-phase mixed solution (hereinafter occasionally abbreviated as "oil phase") was prepared by adding thereto a monomer component consisting of 0.7 part of styrene, 2.7 parts of 2-ethylhexyl acrylate, and 1.4 parts of 55% divinyl benzene (p-ethyl vinylbenzene as the remaining moiety), 0.25 part of sorbitan monooleate as a surfactant (an emulsifier) and 0.15 part of t-butyl hydroperoxide as an oil-soluble oxidizing agent and uniformly dissolving them together.

Separately, an aqueous water phase solution (hereinafter occasionally abbreviated as "water phase") was prepared by dissolving 3 parts of calcium chloride in 150 parts of purified water and was heated to 60° C.

The oil phase was kept stirred at 60° C. and the water phase adjusted in advance to 60° C. was added to the stirred oil phase over a period of five minutes. After this addition has been completed, the resultant mixture was stirred continuously for 10 minutes to obtain a stable HIPE (intermediate product) having a W/O ratio of 30/1. This HIPE and an aqueous solution of 0.1 part of Rongalit (formaldehyde sodium sulfoxylate dihydrate) as a water-soluble reducing agent in 10 parts of water added thereto were stirred together for two minutes.

Then, the cylindrical vessel was deprived of the stirrer and immersed in a water bath at 65° C. and left therein for 45 minutes to effect the static polymerization (bath polymerization) of the HIPE.

The porous material consequently obtained was tested for the ratio of gel portion and the residual monomer content. The experiment is outlined in Table 2 and the results of the determination are shown in Table 3.

EXAMPLE 2

In a cylindrical vessel provided with a stirrer, an oil-phase was prepared by adding thereto a monomer component consisting of 0.7 part of styrene, 2.7 parts of 2-ethylhexyl acrylate, and 1.4 parts of 55% divinyl benzene (p-ethyl vinylbenzene as the remaining moiety) and 0.25 part of sorbitan monooleate as a surfactant (an emulsifier), and uniformly dissolving them together.

Separately, a water phase was prepared by dissolving 3 parts of calcium chloride and 0.1 part of Rongalit (formaldehyde sodium sulfoxylate dihydrate) as a water-soluble reducing agent in 150 parts of purified water and was heated to 70° C.

The oil phase was kept stirred at 70° C. and the water phase adjusted in advance to 70° C. was added to the stirred oil phase over a period of five minutes. After this addition has been completed, the resultant mixture was stirred continuously for 10 minutes to obtain a stable HIPE (intermediate product) having a W/O ratio of 30/1. This HIPE and 0.15 part of t-butyl hydroperoxide as an oil-soluble oxidizing agent added thereto were stirred together for two minutes to obtain a stable HIPE (completed product).

Then, the cylindrical vessel was deprived of the stirrer and immersed in a water bath at 70° C. and left therein for 45 minutes to effect the static polymerization (bath polymerization) of the HIPE.

The porous material consequently obtained was tested for the ratio of gel portion and the residual monomer content. The experiment is outlined in Table 2 and the results of the determination are shown in Table 3.

EXAMPLE 3

An oil phase was prepared by adding a monomer component consisting of 0.8 part of styrene, 2.8 parts of 2-ethylhexyl acrylate, and 1.2 parts of ethylene glycol dimethacrylate, 0.25 part of sorbitan monooleate as a surfactant (an emulsifier) and 0.15 part of cumene hydroperoxide as an oil-soluble oxidizing agent, and uniformly dissolving them together.

Separately, a water phase was prepared by dissolving 2.4 parts of calcium chloride in 250.0 parts of purified water and was heated to 60° C.

The oil phase and the water phase were continuously supplied at a W/O ratio of 50/1 into a stirrer and mixed and emulsified therein. The HIPE (intermediate product) consequently formed was continuously extracted through a path furnished with a reducing agent inlet. Via the reducing agent inlet, triethanolamine was continuously added as a water-soluble reducing agent at a rate of 0.05 part per 100 parts of the HIPE (2.7% by mass based on the monomer component mentioned above; the use ratio (mass ratio) of the oxidizing agent/the reducing agent was set at 1/0.85). They were mixed by the use of a line mixer to form an HIPE (completed product). This HIPE was continuously supplied in the form of a sheet measuring approximately 50 cm in width and about 1 cm in thickness onto a belt installed horizontally and kept in motion at a fixed rate.

The HIPE was passed through a polymerization zone controlled at about 70° C. over a period of about 30 minutes to be polymerized (for the continuous polymerization). The porous material, i.e. the polymerized product, was subsequently dehydrated and compressed under a reduced pressure using a reduced pressure compression roll, and dried with a hot air drier to form a compressed sheet of the porous material measuring about 2 mm in thickness. The porous material was tested for the ratio of gel portion and the residual monomer content. The experiment is outlined in Tables 1 and 2, and at the same time, the results by the determination are shown in Table 3.

EXAMPLES 4 and 5

Porous materials were produced by following the procedure of Example 3 while changing the redox initiator to be added before and after the formation of the HIPE, the monomer component to be used, the temperature for forming the HIPE (temperature for the emulsification), and the polymerization conditions as shown in Table 1. The experiment is outlined in Table 2, and at the same time, the results by the determination are shown in Table 3.

TABLE 1

| | | Oxidizing agent/Reducing agent | | | | | | | Temperature | Polymerization conditions | |
|---|---|---|---|---|---|---|---|---|---|---|---|
| | Before HIPE formation | | After HIPE formation | | | | | | for HIPE | | |
| | | Added amount | | Amount added (parts, per 100 | | Monomer (parts) | | | formation | Temperature | Time |
| Ex. | Kind | (Part) | Kind | parts of HIPE) | ST | 2EHA | DVB | EGDMA | (° C.) | (° C.) | (Min) |
| 3 | Cumene hydroperoxide | 0.15 | Triethanol amine | 0.05 | 0.8 | 2.8 | — | 1.2 | 60 | 70 | 30 |
| 4 | Dimethyl aniline | 0.06 | Benzoyl peroxide | 0.05 | 0.8 | 2.8 | — | 1.2 | 40 | 40 | 20 |
| 5 | Sodium hydrogen sulfite | 0.05 | Cumene hydroperoxide | 0.02 | 0.7 | 2.7 | 1.4 | — | 75 | 75 | 15 |

Note)
ST: Styrene;
2EHA: 2-Ethylhexyl acrylate;
DVB: 55% divinyl benzene;
EGDMA: Ethylene glycol dimethacrylate.

COMPARATIVE EXAMPLE 1

In a cylindrical vessel furnished with a stirrer, an oil phase was prepared by adding a monomer component consisting of 0.7 part of styrene, 2.7 parts of 2-ethylhexyl acrylate, and 1.4 part of 55% divinyl benzene (p-ethyl vinylbenzene as the remaining moiety), 0.25 part of sorbitan monooleate as a surfactant (an emulsifier) and 0.15 part of t-butyl hydroperoxide as an oil-soluble oxidizing agent, and uniformly dissolving them together.

Separately, a water phase was prepared by dissolving 3 parts of calcium chloride and 0.1 part of Rongalit (formaldehyde sodium sulfoxylate dihydrate) as a water-soluble reducing agent in 150 parts of purified water and heated to 60° C.

The oil phase was kept stirred at 60° C. and the water phase adjusted in advance to 60° C. was added to the stirred oil phase over a period of five minutes. When they were continuously stirred thence, the mixture gained in viscosity and gave rise to a gel-like substance in a heterogeneous state. Thus, the experiment was discontinued. The experiment in outlined in Table 2.

COMPARATIVE EXAMPLE 2

The procedure of Example 1 was repeated except for that the addition of 0.1 part of Rongalit (formaldehyde sodium sulfoxylate dihydrate) as a water-soluble reducing agent to the HIPE (intermediate product) was omitted. The produced porous material was tested for the ratio of gel portion and the residual monomer content. The experiment is outlined in Table 2, and at the same time, the results of the test are shown in Table 3.

TABLE 2

| | Oxidizing agent/ Reducing agent | | Monomer Component | Polymerization method | Temperature for HIPE formation (° C.) | Polymerization conditions | | Ratio of gel portion (%) |
|---|---|---|---|---|---|---|---|---|
| | Before HIPE formation | After HIPE formation | | | | Temperature (° C.) | Time (Min) | |
| Example 1 | t-BuOOH | Rongalit | ST/2EHA/DVB | Batch | 60 | 65 | 45 | 85 |
| Example 2 | Rongalit | t-BuOOH | ST/2EHA/DVB | Batch | 70 | 70 | 30 | 87 |
| Example 3 | Cumen hydroperoxide | Triethanol amine | ST/2EHA/EGDMA | Continuous | 60 | 70 | 30 | 82 |
| Example 4 | Dimethyl aniline | Benzoyl peroxide | ST/2EHA/EGDMA | Continuous | 40 | 40 | 20 | 85 |
| Example 5 | SBS | Cumen hydroperoxide | ST/2EHA/DVB | Continuous | 60 | 75 | 15 | 85 |
| Comparative Example 1 | t-BuOOH/ Rongalit | — | ST/2EHA/DVB | — | 60 | Polymerization started during the emulsification, inferior emulsification | | |
| Comparative Example 2 | t-BuOOH | — | ST/2EHA/DVB | Batch | 60 | 65 | 45 | 15 |

Note)
t-BuOOH: t-Butyl hydroperoxide;
Rongalit: Formaldehyde sodium sulfoxylate dihydrate;
NaPS: Sodium persulfate;
SBS: Sodium hydrogen sulfite;
ST: Styrene;
2EHA: 2-Ethylhexyl acrylate;
DVB: 55% Divinyl benzene;
EGDMA: Ethylene glycol dimethacrylate.

TABLE 3

|  | Ratio of gel portion (%) | Residual monomer content |
|---|---|---|
| Example 1 | 85 | Not more than 0.1 |
| Example 2 | 87 | Not more than 0.1 |
| Example 3 | 82 | Not more than 0.1 |
| Example 4 | 85 | Not more than 0.1 |
| Example 5 | 85 | Not more than 0.1 |
| Comparative Example 2 | 15 | Large amount |

The entire disclosure of Japanese Patent Application No. 11-328,683 filed on Nov. 18, 1999 including specification, claims, drawings and summary are incorporated herein by reference in its entirety.

What is claimed is:

1. A method for the production of a porous material comprising a step of polymerizing a water-in-oil type high internal phase emulsion containing a polymerization initiator, wherein said polymerization initiator is a redox type initiator combining an oil-soluble oxidizing agent and a reducing agent, either of the oil-soluble oxidizing agent or the reducing agent is preparatorily added to form the emulsion, and thereafter the remainder of the reducing agent or the oil-soluble oxidizing agent is added to the emulsion to polymerize the added emulsion.

2. A method according to claim 1, wherein said emulsion formed by the addition of said reducing agent in advance is polymerized by the addition thereto of an oil-soluble oxidizing agent.

3. A method according to claim 1, wherein the difference between the temperature for forming said emulsion and the polymerization temperature of said emulsion is not more than 20° C.

4. A method according to claim 1, wherein said polymerization step comprises a continuous polymerization.

* * * * *